(12) United States Patent
Hoogeveen et al.

(10) Patent No.: US 10,907,390 B2
(45) Date of Patent: Feb. 2, 2021

(54) GALLEY TROLLEY COMPARTMENT DOORS

(71) Applicant: Safran Cabin Netherlands N.V., Alkmaar (NL)

(72) Inventors: Andreas Hoogeveen, Enkhuizen (NL); Maarten Korenromp, Heerhugowaard (NL)

(73) Assignee: Safran Cabin Netherlands N.V., Alkmaar (NL)

( * ) Notice: Subject to any disclaimer, the term of this patent is extended or adjusted under 35 U.S.C. 154(b) by 292 days.

(21) Appl. No.: 15/927,457

(22) Filed: Mar. 21, 2018

(65) Prior Publication Data

US 2018/0273157 A1  Sep. 27, 2018

Related U.S. Application Data

(60) Provisional application No. 62/474,271, filed on Mar. 21, 2017.

(51) Int. Cl.
| | | |
|---|---|---|
| *E05D 15/26* | (2006.01) | |
| *E06B 3/48* | (2006.01) | |
| *E05D 7/00* | (2006.01) | |
| *B64D 11/04* | (2006.01) | |

(52) U.S. Cl.
CPC ............ *E05D 15/264* (2013.01); *E06B 3/481* (2013.01); *E06B 3/482* (2013.01); *B64D 11/04* (2013.01); *E05D 7/009* (2013.01); *E05Y 2201/22* (2013.01); *E05Y 2900/502* (2013.01)

(58) Field of Classification Search
CPC . E06B 3/481; E06B 3/48; E06B 3/482; E05D 15/264; E05D 11/10; E05D 11/1007; E05D 11/1014; E05D 11/1078; B64D 11/04; E05B 63/0008; E05B 65/0085; B64C 1/1461; B64C 1/1469; A47B 31/00;
(Continued)

(56) References Cited

U.S. PATENT DOCUMENTS 2,788,067 A * 4/1957 Pawlak ................. E05D 15/264
                                                              160/213
3,103,968 A * 9/1963 Reinhardt ............... E05F 15/54
                                                              160/188
(Continued)

FOREIGN PATENT DOCUMENTS

| GB | 2511165 | 8/2014 |
|---|---|---|
| JP | 3057092 | 6/2000 |
| WO | 2015/148813 | 10/2015 |

OTHER PUBLICATIONS

International Patent Application No. PCT/IB2018/051904, International Search Report and Written Opinion dated May 4, 2018.

*Primary Examiner* — Johnnie A. Shablack
(74) *Attorney, Agent, or Firm* — Kilpatrick Townsend & Stockton LLP

(57) ABSTRACT

Galley trolley compartment doors that replace traditional trolley retainer latches used to secure trolleys when positioned in galley compartments. The galley trolley compartment doors are designed with engaging arms that help secure the trolleys in place under required loads. Some embodiments of the galley trolley compartment doors are designed with thicknesses that can help improve cooling of the trolley compartment.

11 Claims, 12 Drawing Sheets

(58) Field of Classification Search
CPC .............. A47B 31/06; A47B 2031/002; A47B 2031/003
USPC ........................................ 160/213, 199, 206
See application file for complete search history.

(56) References Cited

U.S. PATENT DOCUMENTS

| | | | | |
|---|---|---|---|---|
| 3,302,690 A * | 2/1967 | Hurd | ................ | E06B 7/367 160/40 |
| 3,400,749 A * | 9/1968 | Smith | ................ | E05B 1/0015 160/213 |
| 3,813,730 A * | 6/1974 | Smith | ................ | E05D 5/02 16/382 |
| 3,871,083 A * | 3/1975 | Smith | ................ | E05D 5/02 16/383 |
| 4,191,412 A * | 3/1980 | LeKander | ................ | A62C 2/16 292/182 |
| 4,199,176 A * | 4/1980 | Kelly | ................ | E05C 9/063 292/141 |
| 4,607,965 A * | 8/1986 | Belanger | ................ | E05D 15/063 384/276 |
| 4,620,581 A * | 11/1986 | Wallace | ................ | E06B 9/02 160/187 |
| 4,679,277 A | 7/1987 | Shibata | | |
| 4,893,666 A * | 1/1990 | Hormann | ................ | E06B 7/367 160/229.1 |
| 5,002,114 A * | 3/1991 | Hormann | ................ | E06B 3/485 160/201 |
| 5,522,446 A * | 6/1996 | Mullet | ................ | B29C 31/00 160/229.1 |
| 5,601,131 A * | 2/1997 | Morris | ................ | E05B 65/0021 160/207 |
| 5,613,541 A * | 3/1997 | Bradbury | ................ | B60J 5/14 160/231.2 |
| 6,213,189 B1 * | 4/2001 | Hormann | ................ | E06B 3/485 160/229.1 |
| 6,357,806 B1 * | 3/2002 | Saku | ................ | E05B 63/143 292/182 |
| 6,360,487 B1 * | 3/2002 | Kern | ................ | E06B 3/4636 160/197 |
| 6,470,952 B1 * | 10/2002 | Cline | ................ | E05D 15/266 160/118 |
| 6,810,938 B2 * | 11/2004 | Aquilina | ................ | E05D 1/04 16/355 |
| 6,823,927 B2 * | 11/2004 | Steel | ................ | E05D 3/022 16/49 |
| 6,941,764 B2 * | 9/2005 | Leroy | ................ | A47B 31/02 239/430 |
| 6,955,206 B2 * | 10/2005 | Mullet | ................ | E05D 15/165 160/193 |
| 7,055,573 B2 * | 6/2006 | Martin | ................ | E05D 15/24 160/201 |
| 7,134,471 B2 * | 11/2006 | Bennett, III | ................ | E05D 15/242 160/201 |
| 7,681,621 B2 * | 3/2010 | Manser | ................ | E05D 11/00 160/229.1 |
| 8,096,341 B2 * | 1/2012 | Teunissen | ................ | E05D 15/26 160/199 |
| 8,167,386 B2 * | 5/2012 | Bergesch | ................ | E05B 65/02 292/32 |
| 8,322,654 B2 * | 12/2012 | Gomes | ................ | B64C 1/1423 244/118.5 |
| 8,819,993 B1 * | 9/2014 | Chen | ................ | E05D 15/26 160/195 |
| 8,918,929 B2 * | 12/2014 | Kayser | ................ | A47D 7/00 5/100 |
| 9,428,259 B2 | 8/2016 | Savian et al. | | |
| 9,428,940 B1 * | 8/2016 | Patrick | ................ | E05B 63/14 |
| 9,487,297 B2 * | 11/2016 | Long | ................ | B64C 1/1469 |
| 9,802,704 B2 * | 10/2017 | Young | ................ | B64D 11/04 |
| 9,994,320 B2 * | 6/2018 | Long | ................ | E06B 3/805 |
| 10,472,068 B2 * | 11/2019 | Coombs | ................ | B64D 13/06 |
| 2005/0241781 A1 * | 11/2005 | Johnson | ................ | E05F 15/50 160/199 |
| 2014/0265355 A1 * | 9/2014 | Tien | ................ | E05B 17/2053 292/21 |
| 2015/0330126 A1 * | 11/2015 | Ma | ................ | E05C 9/04 292/32 |
| 2016/0264246 A1 * | 9/2016 | Young | ................ | B64D 11/04 |
| 2018/0037324 A1 * | 2/2018 | Young | ................ | B64D 11/04 |
| 2018/0209206 A1 * | 7/2018 | Castaldi, III | ............ | E05D 15/48 |

* cited by examiner

GALLEY TROLLEY COMPARTMENT DOORS

CROSS REFERENCE TO RELATED APPLICATIONS

This application claims the benefit of U.S. Provisional Application Ser. No. 62/474,271, filed Mar. 21, 2017 titled "Galley Trolley Compartment Doors with Integrated Retainers," the entire contents of which are hereby incorporated by reference.

FIELD OF THE DISCLOSURE

Embodiments of the present disclosure relate generally to galley trolley compartment doors that replace traditional trolley retainer latches used to secure trolleys when positioned in galley compartments. Even instances of trolley compartments that used trolley doors still needed to use retainer latches because the doors were not designed to withstand required loads. The galley trolley compartment doors described herein are designed with engaging and overlapping arms that help secure the trolleys in place under required flight loads and emergency crash loads. Some embodiments of the galley trolley compartment doors are designed with thicknesses that can help improve cooling of the trolley compartment.

BACKGROUND

Aircraft and other passenger transportation vehicles are often provided with galleys or other food preparation areas in which trolleys are stored. Trolleys are traditionally used to hold meals, snacks, drinks, and other passenger nourishment or consumable items. The trolleys are wheeled in the aisle to offer meal and beverage service, and are typically stored in a galley area when not in use.

When not in use, storage of trolleys in galley compartments has traditionally been secured by dual latches. Dual latches are generally required in order to provide primary and secondary retention systems. Examples are of prior art dual latches illustrated by FIG. 13. The dual latches are integrated into an upper part of the galley work deck and often require a reinforced work deck due to the required structural loads of the trolleys that the latches must support. For example, the latches must support a force that is many times the weight of the trolleys, which is mainly driven by flight loads as well as required emergency crash loads.

The retaining devices also protrude to the front, such that they stick out from the front face of the doors/trolleys. In many aircraft galley designs, this protrusion can create a problem where additional space for such protrusion is not readily available and/or where protrusion is otherwise undesirable, for example, escape path routing. Improved retaining methods are desired.

Additionally, in certain instances, in addition to the dual latches, some trolley compartments have also been provided with doors intended to retain any cooled air within the trolley compartment. However, this can result in lost space due to the space required by the door (typically one inch) in addition to the space required by the retainers (also typically one inch). These doors are not designed to be retention doors; trolley retention has still been primarily maintained by the dual latches (although in some instances when doors have been used, the door hinge has supported part of the load as well).

BRIEF SUMMARY

Embodiments of the invention described herein thus provide systems and methods for a trolley compartment door system, comprising: first and second panels configured to cooperate as a bi-fold door, the first panel comprising a first arm, the second panel comprising a second arm, wherein the first and second arms are hinged to one another and overlap when the bi-fold door is closed, wherein the first panel is hinged to a first trolley compartment side wall at a first load transferring attachment point; and wherein the second panel is removably securable to a second trolley compartment side wall at a second load transferring attachment point. The bi-folded door transfers structural loads to the first and second trolley compartment side walls and not locally via latches. This transfer is substantially evenly distributed. The first and second arms may be provided on end caps that are secured to the first and second panels.

Other examples include a locking feature. In one instance, the locking feature is a dual locking feature with first and second latches that operate first and second lock bars. The first and second latches can be activated simultaneously via one hand.

It is possible to provide the first and second panels as insulated in order to maintain chilled air in the trolley compartment.

DETAILED DESCRIPTION

Embodiments of the present invention provide bi-fold doors for installation in front of the trolley compartments. One side of the bi-fold door is positioned with respect to a retaining wall feature when the door is closed and the folding hinge portion is straightened. When the bi-fold door is opened, one stable end stays secured with respect to the trolley compartment wall, and an opening/moveable end moves sideways. This movement may occur within a track that is fixed to the galley work deck or other upper and/or lower structure. Internal bumpers or seals may also be provided. This can ensure a leak-proof sealed and retained connection. This can also improve the chilled compartment functionality. The panels of the bi-fold door may be latched or locked to one another when folded together by an interlink, lock, or (slide) latch mechanism, which prevents the panels from hinging with respect to one another when closed. This in turn prevents the door from moving out of its retaining wall feature.

Figure 1:
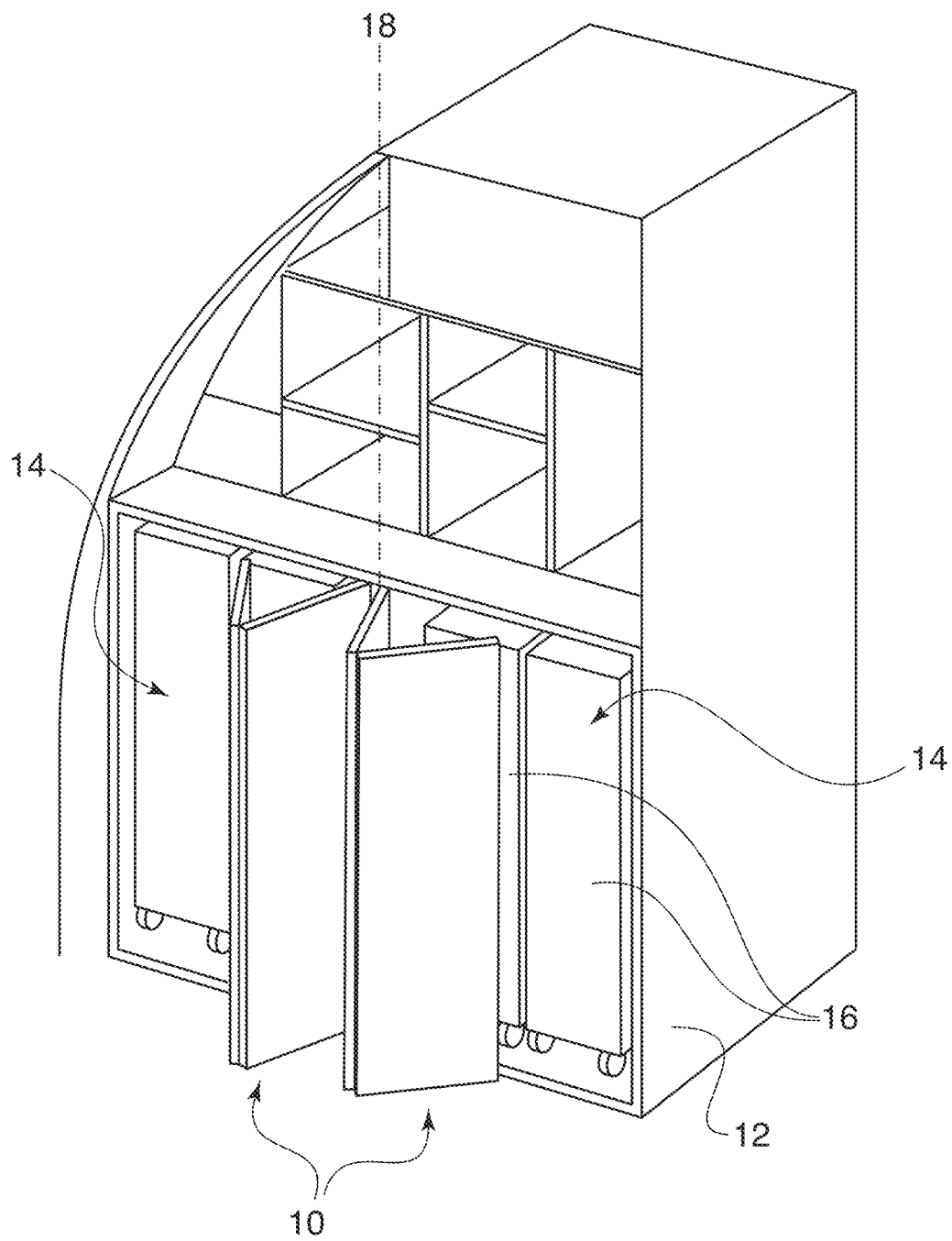
FIG. 1 shows a perspective view of a galley monument with trolley compartments being enclosed by two sets of bi-fold doors.
Figure 12A:
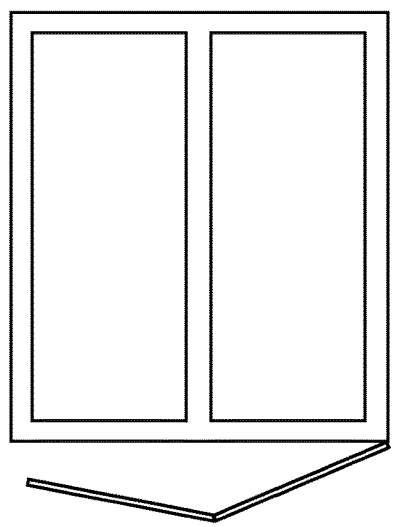
FIG. 12A shows a top plan view of two fill size trolleys positioned in the trolley compartment.
Figure 12B:
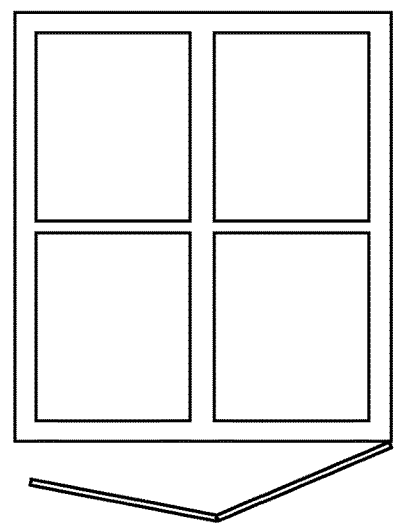
FIG. 12B shows a top plan view of four half size trolleys positioned in the trolley compartment.
Figure 13:
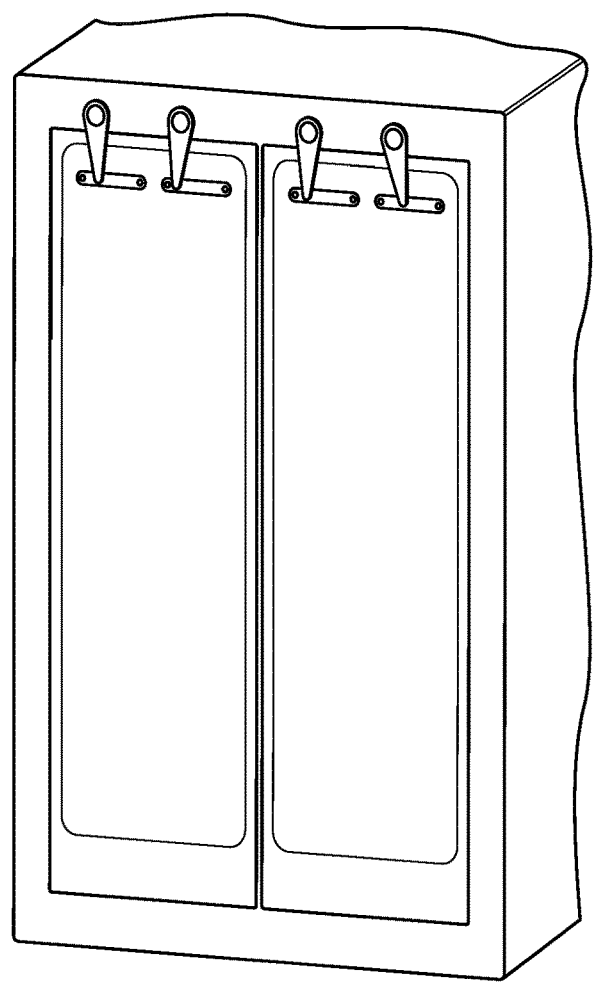
FIG. 13 shows a front perspective view of prior art dual latches used to secure trolleys in place in a trolley compartment.

Referring now to FIG. 1, one embodiment of a bi-fold door 10 configuration is illustrated. In this example, two bi-fold doors 10 are shown. The doors 10 are mounted with respect to a galley monument 12 and enclose galley trolley compartments 14. Although described with respect to a galley monument, it should be understood that the doors described herein may be used with respect to any trolley storage compartment. FIG. 1 illustrates two separate side-by-side trolley compartments 14. Each trolley compartment 14 is sized to receive two full sized trolleys 16, as illustrated by FIG. 12A. Alternatively, the same sized trolley compartment may received four half size trolleys, in front to back configuration, as illustrated by FIG. 12B. Half size trolleys generally have the same width as full size trolleys, but are half of the length.

In this example, each trolley compartment 14 has a bi-fold door 10 that opens inwardly, toward a center line 18, and toward a bi-fold door 10 of an adjacent compartment 14. It should be understood that a single bi-fold door may be used to enclose a single compartment. It should also be understood that the bi-fold doors may be any appropriate size, and that it is possible to incorporate doors according to this disclosure for larger or smaller compartments, simply by altering the size of the door panels.

Figure 2:
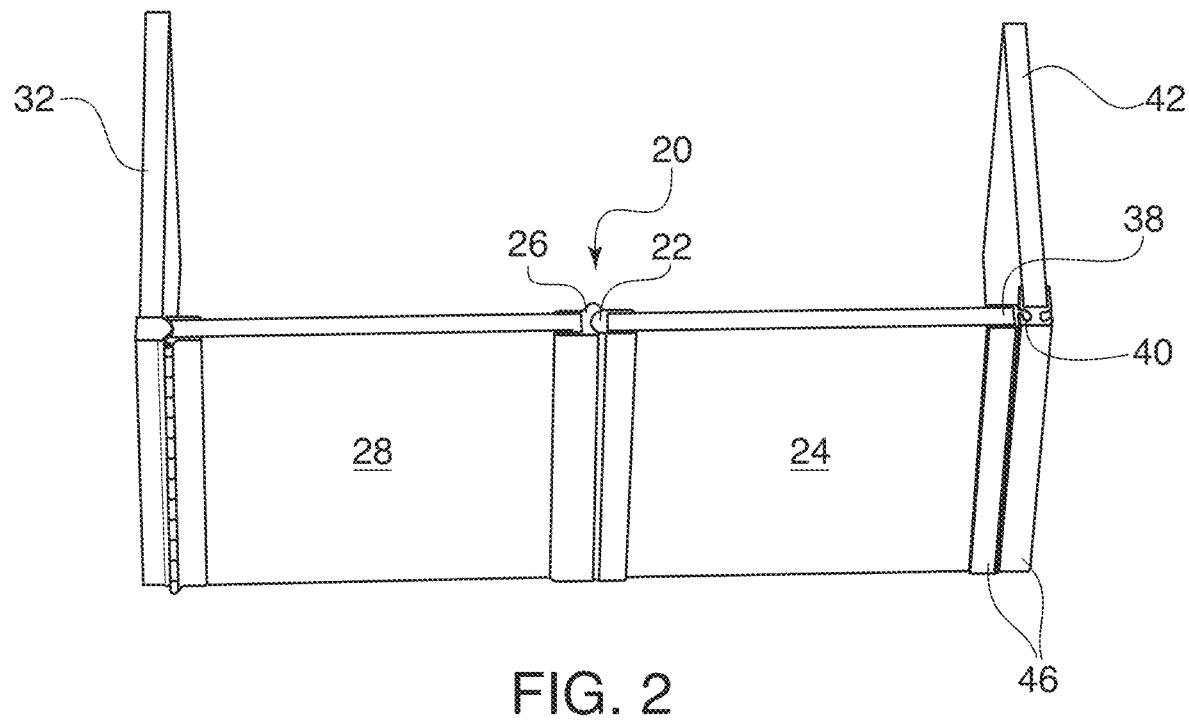
FIG. 2 shows a front perspective view of one embodiment of a bi-fold door with a curved central hinge.
Figure 2A:
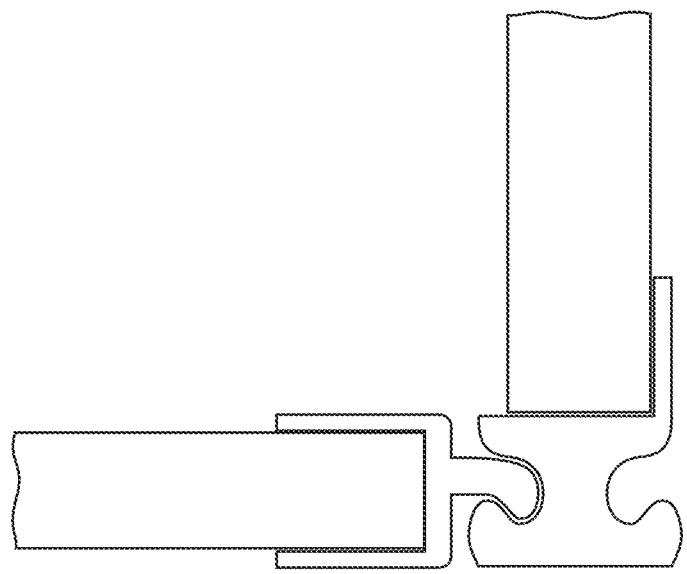
FIG. 2A shows a close up view of the point at which one of the panels is removably securable to a trolley compartment side wall at a load transferring attachment point.
Figure 3:
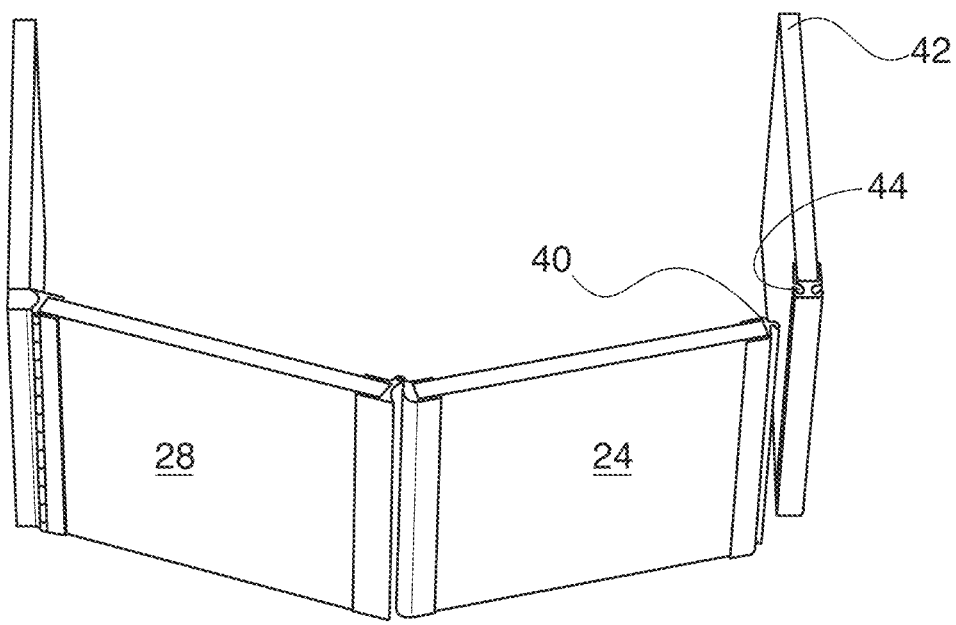
FIG. 3 shows a front perspective view of the embodiment of FIG. 2 partially opened.
Figure 3A:
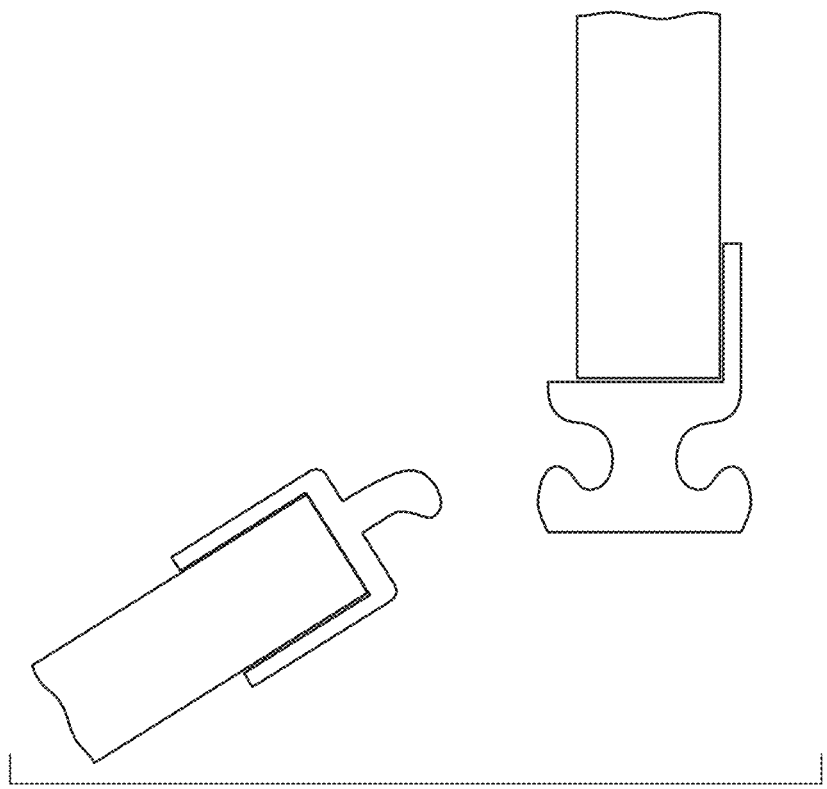
FIG. 3A shows a close up view of the point at which one of the panels is being removed from a trolley compartment side wall for bi-folding of the panels with respect to one another.
Figure 4:
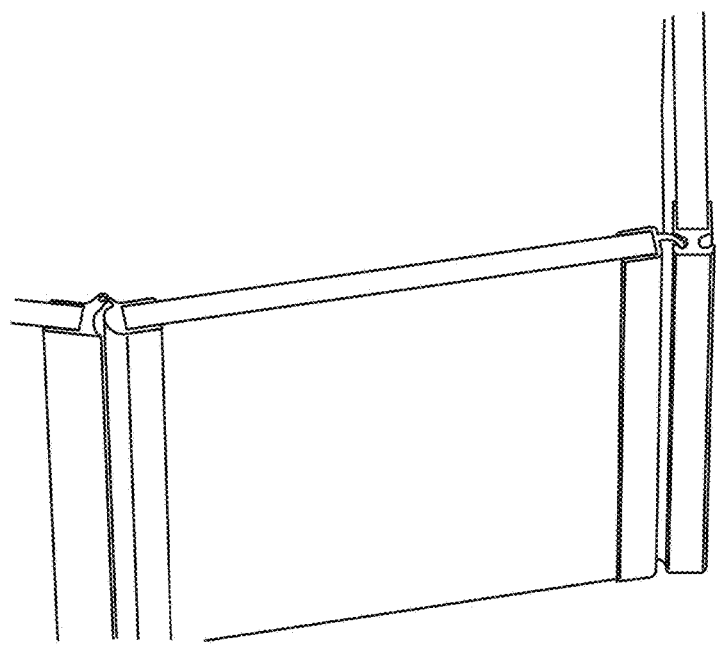
FIG. 4 shows a close-up view of one embodiment of a wall connection option for a bi-fold door system.
Figure 4A:
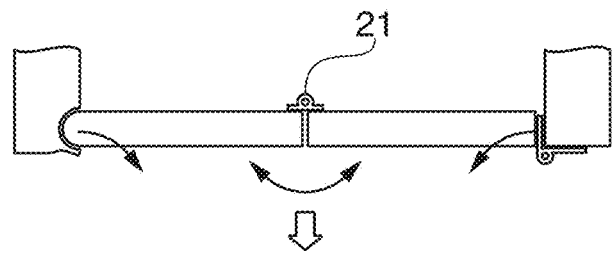
FIG. 4A shows a top plan view of a rear hinge that may be used with the embodiments of FIG. 2 or FIG. 4.

FIG. 2-4 illustrate one example of a bi-fold door having a curved central hinge 20. The curved central hinge 20 may be formed by a convexly curved portion 22 on a first panel 24 and a concave curved portion 26 on a second panel 28. The convexly curved portion 22 and concave curved portion 26 cooperate with respect to one another in order to help define the curved central hinge 20. Central hinge 20 may also be defined by a rear hinge pin or a rear piano-type hinge 21 that helps secure the two panels 24, 28 of the bi-fold door to one another, shown in FIG. 2A. This feature can also help ensure that the doors stay air tight, preventing any heat loss of chilled air from the compartments.

The hinge 21 may function as a seal that also acts as the spring force to "straighten" the door panels closed. The rounded edges on both sides and on the curved central hinge 20 can "slide" into the fixed rounded structures, creating a structural interconnection throughout the full vertical length of the hinge and side walls. For improved cooling (containment of chilled air in the compartment and cooled trolley contents), a seal can be integrated in the rounded/curved area to close the leakage completely.

The second panel 28 may have a side edge 30 that is installed with respect to the compartment 14 in a stable manner. This means that the side edge 30 stays secured with respect to the trolley compartment wall 32, although it is allowed to pivot with respect thereto as the bi-fold door is opened and closed. Side edge 30 is shown having an optional concave curved surface 34 that cooperates with a corresponding outward curve 36 on the wall 32. Securement of the side edge 30 to the door may be via a rear hinge pin or a piano-type hinge, as described above.

The first panel 24 is an opening/movable panel. In the example shown, panel 24 has a side edge 38 with a curved tooth 40. The corresponding compartment wall 42 is provided with a corresponding curved receiver 44. In use, the curved tooth 40 engages the curved receiver 44 in order to secure the first panel 24 with respect to the wall 42. This may help provide a greater force support than a typical side latch or lock. This may also help provide a greater force support as compared to a more standard wall connection. However, it should be understood that rather than the curved tooth configuration, it is possible for alternate shapes to be provided. For example, the tooth may be a rectangularly angled latch that cooperates with a corresponding rectangularly angled receiver. As shown, the curved portions 22, 26 or curved surfaces 34, 36 and/or the curved tooth/receiver 40, 44 (or other shapes, if provided) may all be provided on end cap portions 46 that are secured to the panels 24, 28 or to the wall edges 32, 42. This can help ease manufacturing of the panels and walls by providing separate end caps 46 that mate or otherwise cooperate with one another as desired.

FIG. 2 illustrates the panels 24, 28 in a closed configuration. FIG. 3 illustrates the panels as they are beginning to be opened, as the curved tooth 40 releases from the corresponding curved receiver 44. FIG. 4 shows a close-up view of cooperation between the curved tooth 40 and the corresponding curved receiver 44.

Figure 5:
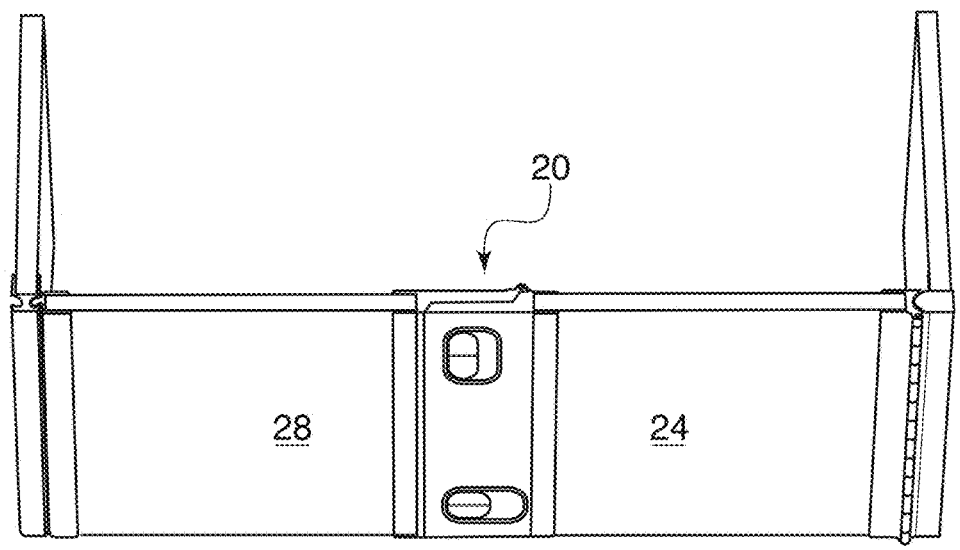
FIG. 5 shows a front perspective view of one embodiment of a bi-fold door with an overlapping arm configuration.
Figure 5A:
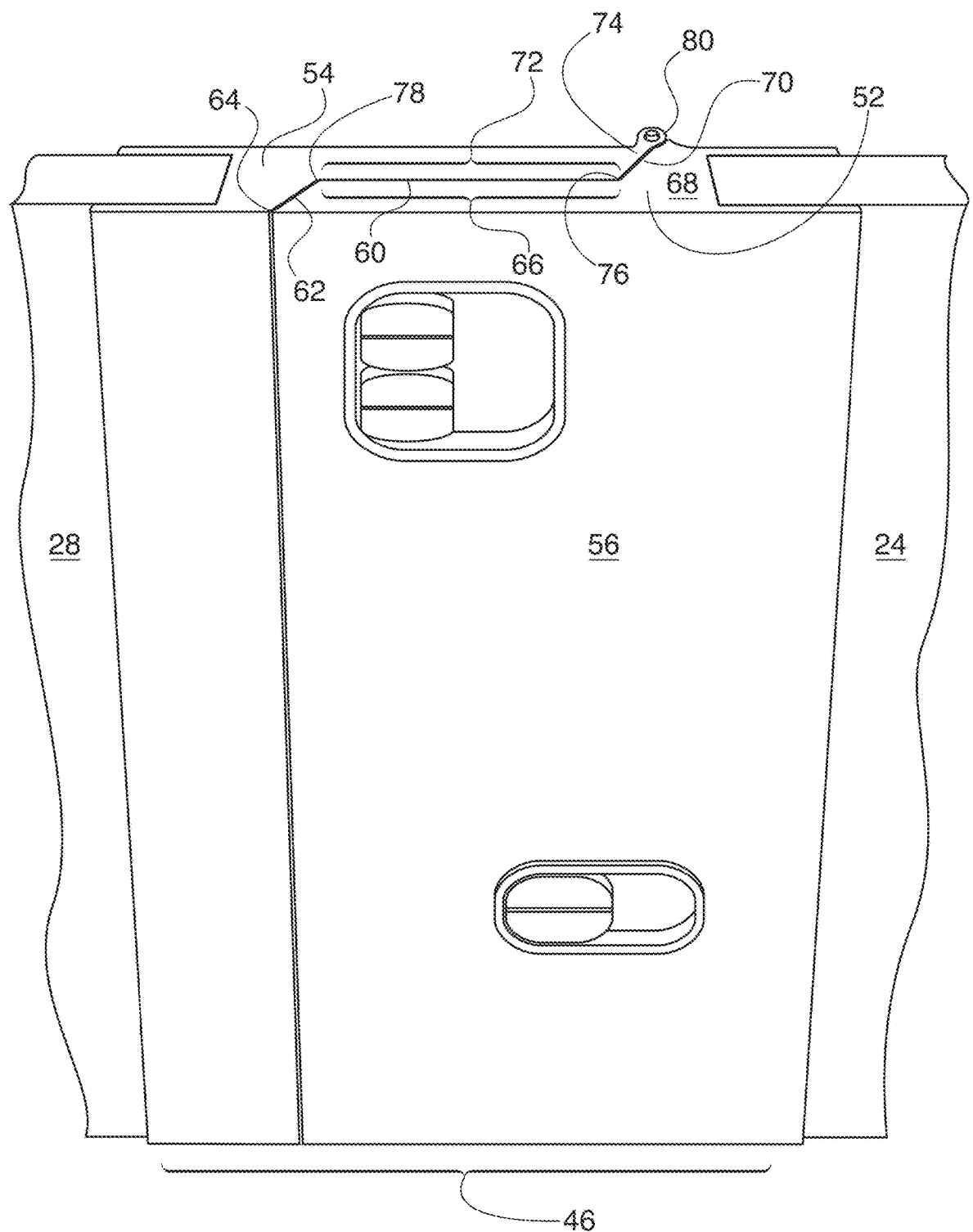
FIG. 5A shows a close-up view of overlapping arms.
Figure 6:
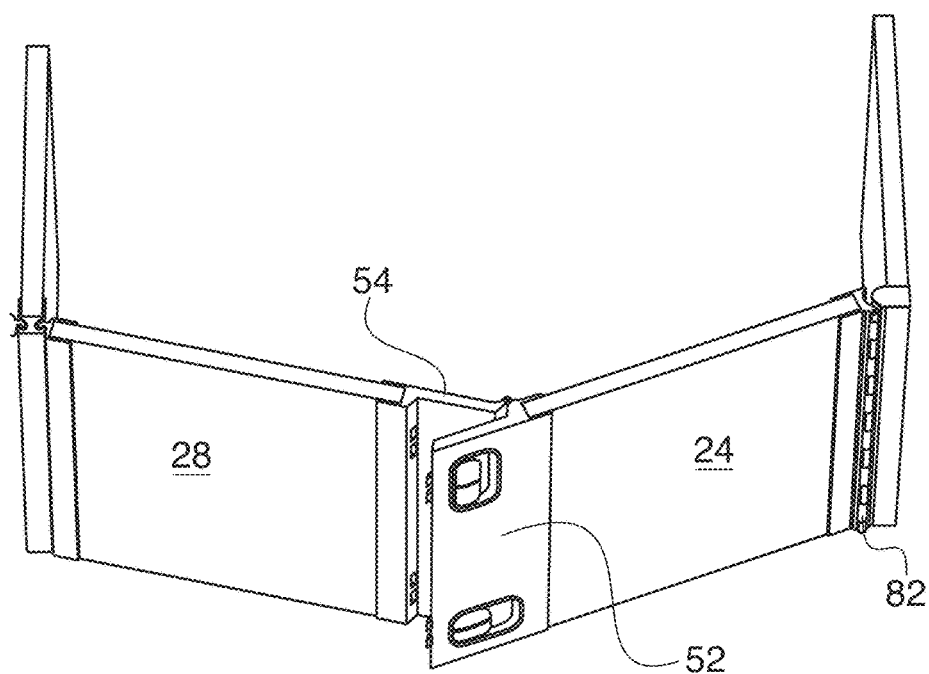
FIG. 6 shows the overlapping arms of FIG. 5 as they are beginning to hinge away from one another.
Figure 7:
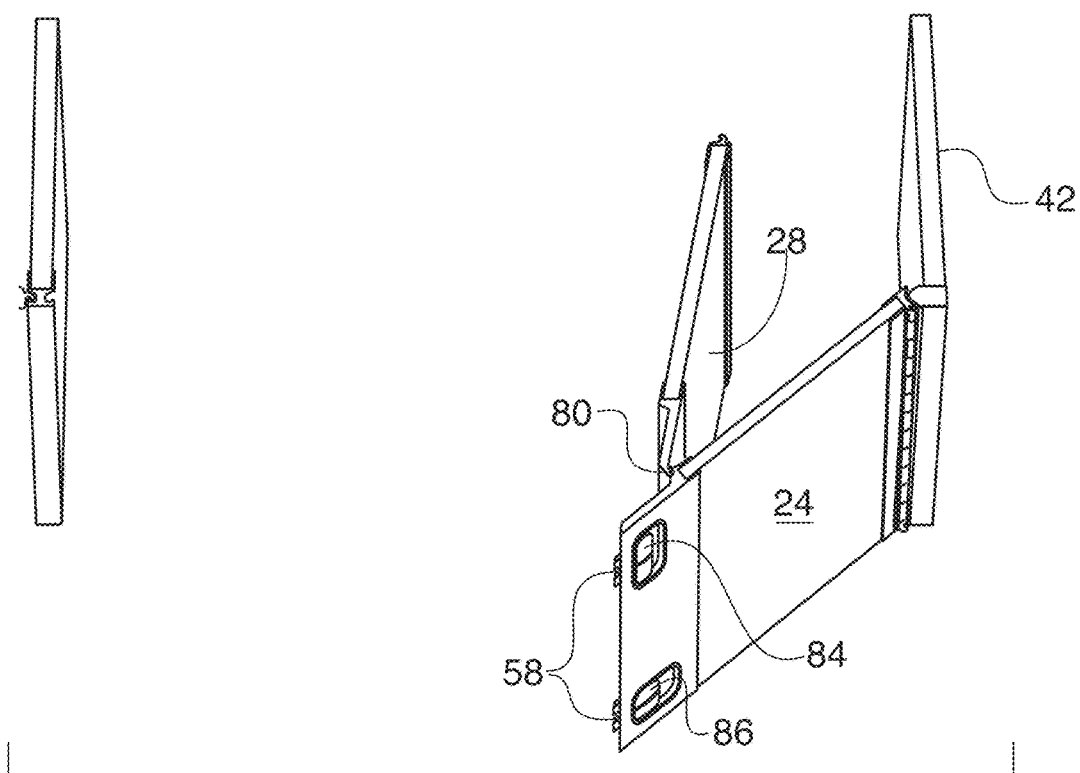
FIG. 7 shows the overlapping arms of FIG. 5 as the bi-fold door is being opened.

FIGS. 5-7 illustrate an alternate embodiment of a bi-fold door with an overlapping arm configuration 50. This overlapping arm configuration 50 provides additional strength to the bi-fold door locking and latching and allows it to withstand the high forces required by many federal aviation regulations. In this example, the panels 24, 28 are illustrated as having similar wall attachment options as described above, but with central overlapping arms 52, 54. A first arm 52 (shown as the forward arm on the first panel 24 in FIGS. 6 and 7) has an outward face 56 with dual locking features, described further below. As illustrated by FIGS. 5 and 5A, the first arm 52 also has an inner face 60. The inner face 60 of the first arm 52 is shaped as having a first angled edge 62 defined between an arm tip 64 and an inner arm surface 66. (Inner arm surface 66 is shown as a straight surface, but it should be understood that any other shape or configuration is possible, as long as inner arm surface 66 corresponds to the outer surface of second arm 54.) The first arm 52 terminates at a base 68 defining a second angled edge 70.

The second arm 54 has corresponding mating features, but in reverse. More specifically, second arm 54 defines a rear arm. Its arm mating surface 72 has an angled edge 74 that cooperates with second angled edge 70 of the first arm 52. An elbow 76 of the second arm 54 rests against the intersection of the inner arm surface 60 and the base 68. The remainder of arm mating surface 72 of the second arm 54 defines a surface that abuts the inner arm surface of the first arm 42. A mating ledge 78 of the second arm 54 receives the angled edge 62 of the first arm 52. When the bi-fold door is closed 10, the components all align as illustrated by FIG. 5A. The presence of the first arm that overlaps the second 54 provides a reinforced door system that can withstand higher forces. The angled faces and ledges help ensure that the arms 52, 54 will not slide or otherwise move out of alignment with one another.

In certain embodiments, the components are provided as end caps 46 that can be positioned over the flat square edges of the door panels as shown in order to ease manufacturing. FIG. 5A also illustrates a securement hinge 80 that maintains the panels 24 and 28 is pivotable cooperation with one another. Due to the nature of the force that the bi-fold door should be able to withstand, the arm length can reduce the bending forces of the locking bolts/lock bar. As long as the arms between hinge point 80 and locking area is long enough, the lock bar will be primarily loaded with shear loads. As illustrated by FIGS. 6 and 7, as the panels 24, 28 begin to open more fully and close onto one another, they remain connected via securement hinge 80. These figures also illustrate that the side on which the stable panel is secured may be provided with an integrated hinge 82. Integrated hinge 82 provides a series of mating loops, in which every other loop appears on the panel 24 or on the wall 42. A pin or other securement member may secure the panel to the wall in pivotable relationship.

Figure 8:
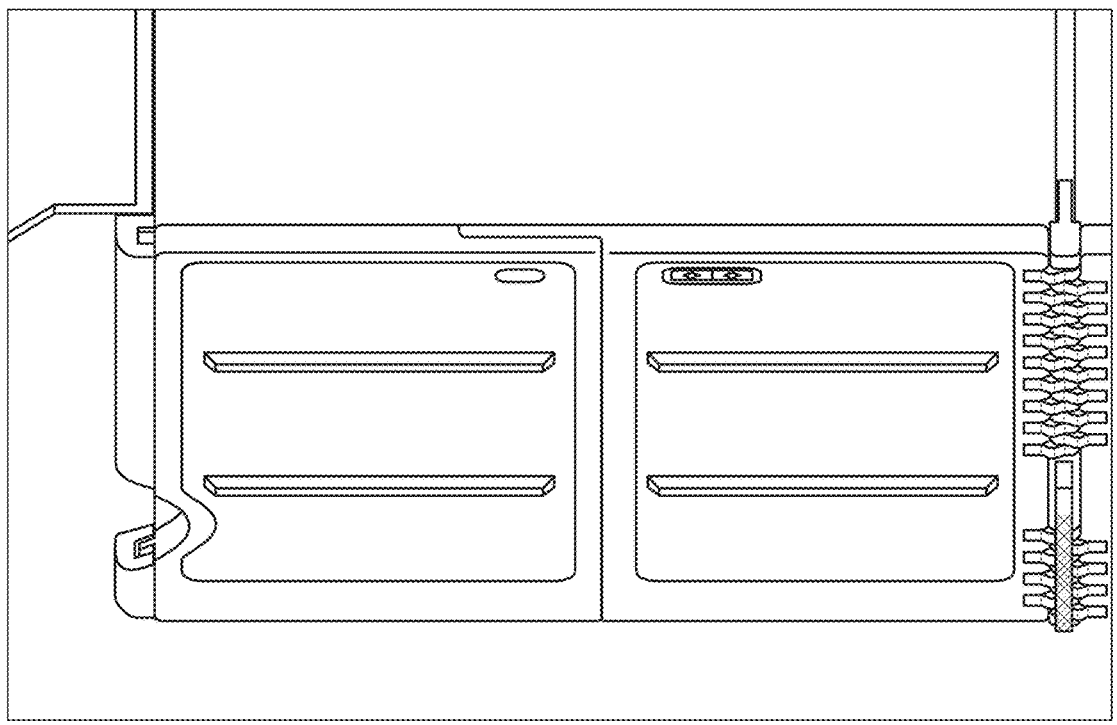
FIG. 8 shows a front perspective view of one embodiment of a bi-fold door having overlapping arms with right angled ledges that cooperate/abut one another.
Figure 8A:
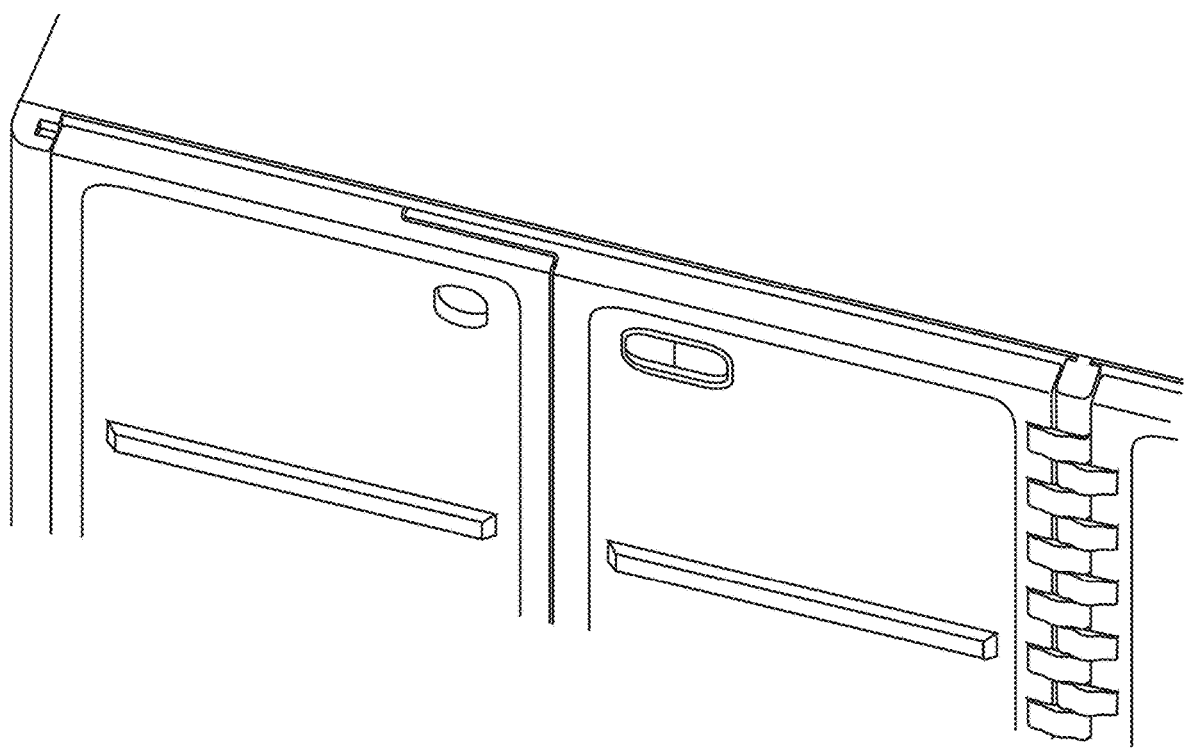
FIG. 8A shows a top perspective view of the overlapped arms.

FIG. 8 illustrates an embodiment in which the interfacing faces are more angular. They need not be exactly 90 degrees with respect to one another, but they are closer to right angles than the FIG. 5-7 embodiment.

Figure 9:
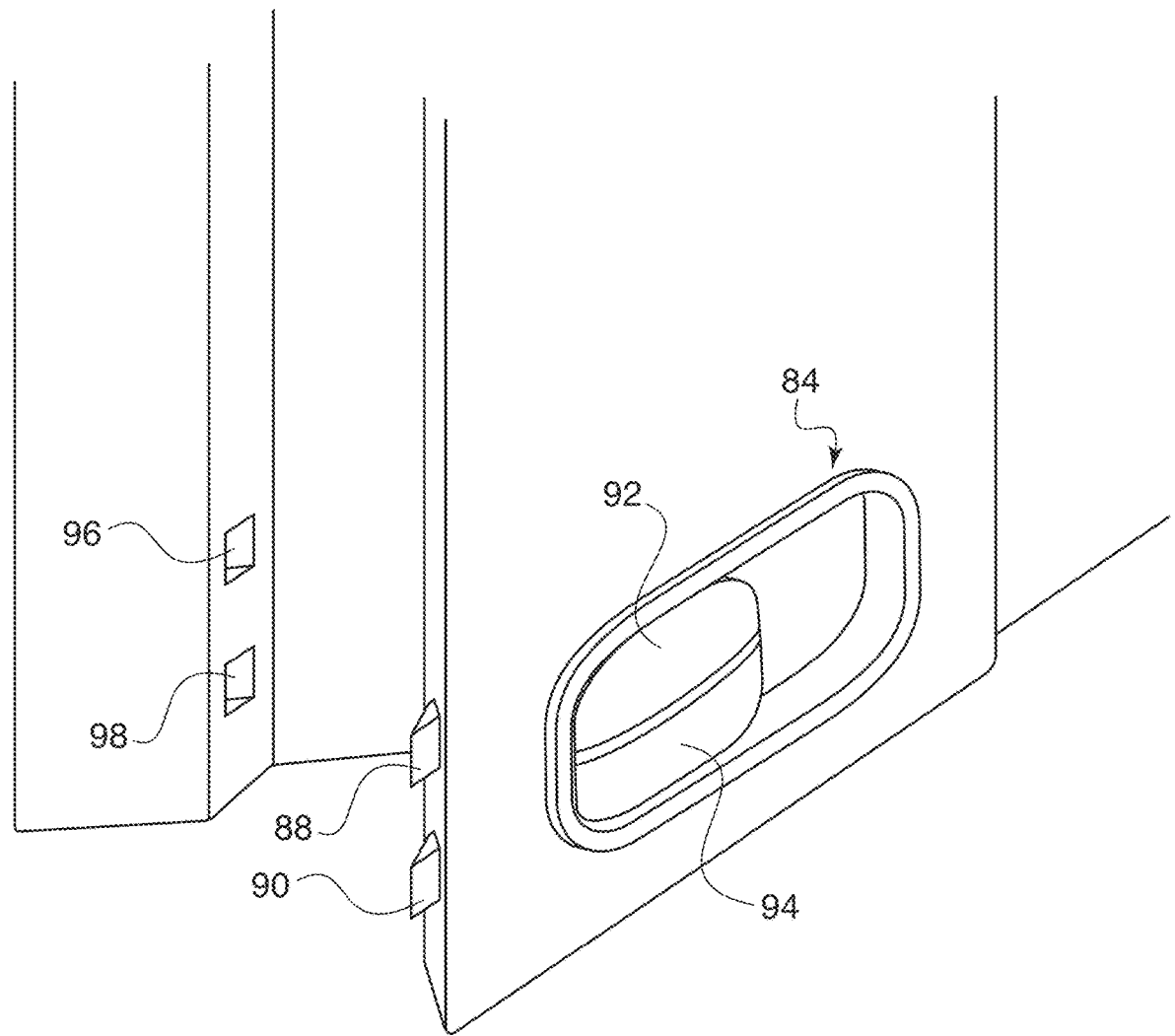
FIG. 9 shows a close-up view of one embodiment of a latching or locking system.

FIGS. 5-7 also illustrate a locking feature 58 that defines a dual lock system. The dual lock system has first and second lock portions 84, 86. Because the lock portions 84, 86 have similar features, only one of the lock portions will be described. However, it should be understood that more than two lock features may be provided for added locking security. In order to meet federal regulations, it is necessary to provide a dual lock on an aircraft or other passenger transportation vehicles for safety and to meet regulations dictating the storage of trolleys or carts. The dual locking systems must be independent from each other, so that if one locking system fails, the other locking system will still work. As illustrated, the lock features may be provided in different configurations, such as one being more horizontally aligned and the other being more vertically aligned. In another example, the lock features may be linked to each other within the panel via a linkage mechanism. FIG. 9 illustrates each lock feature including a first lock bar 88 and a second lock bar 90. The lock bars 88, 90 are movable via latches 92, 94. The lock bars 88, 90 are finger activated, such that a user may pull on the individual cover latches 92, 94 separately or together. In most cases, the user may insert his/her fingers together underneath the latches 92, 94 and pull them both together in order to release the door. Pressure on the latches 92, 94 causes the corresponding lock bars 88, 90 to release from their corresponding securement positions 96, 98 on the second panel 28. Releasing pressure on the latches causes the lock bars 88, 90 to extend back through the lock body and to engage the securement positions 96, 98 when the first and second panels 24, 28 are aligned in planar cooperation. It should be understood that the positions of the lock bars 88, 90 and the securement positions 96, 98 may be moved between panels. In an alternate embodiment, one lock 84 is mounted on one of the panels and a second lock 86 is mounted on the other of the panels.

Figure 10:
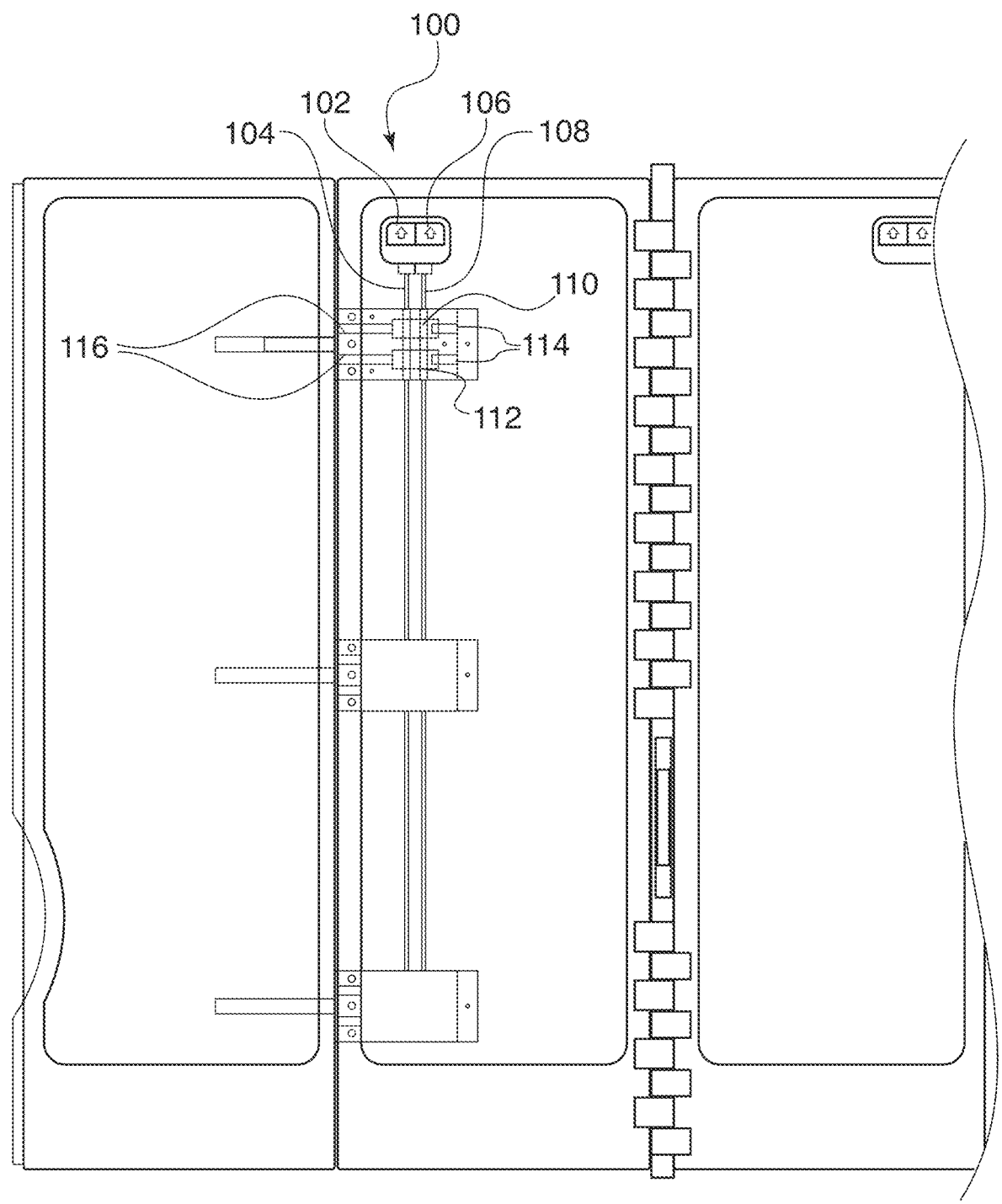
FIG. 10 shows a front plan view of a bi-fold door with three locking modules, with dual bolt locks and a set of dual latches.
Figure 11:
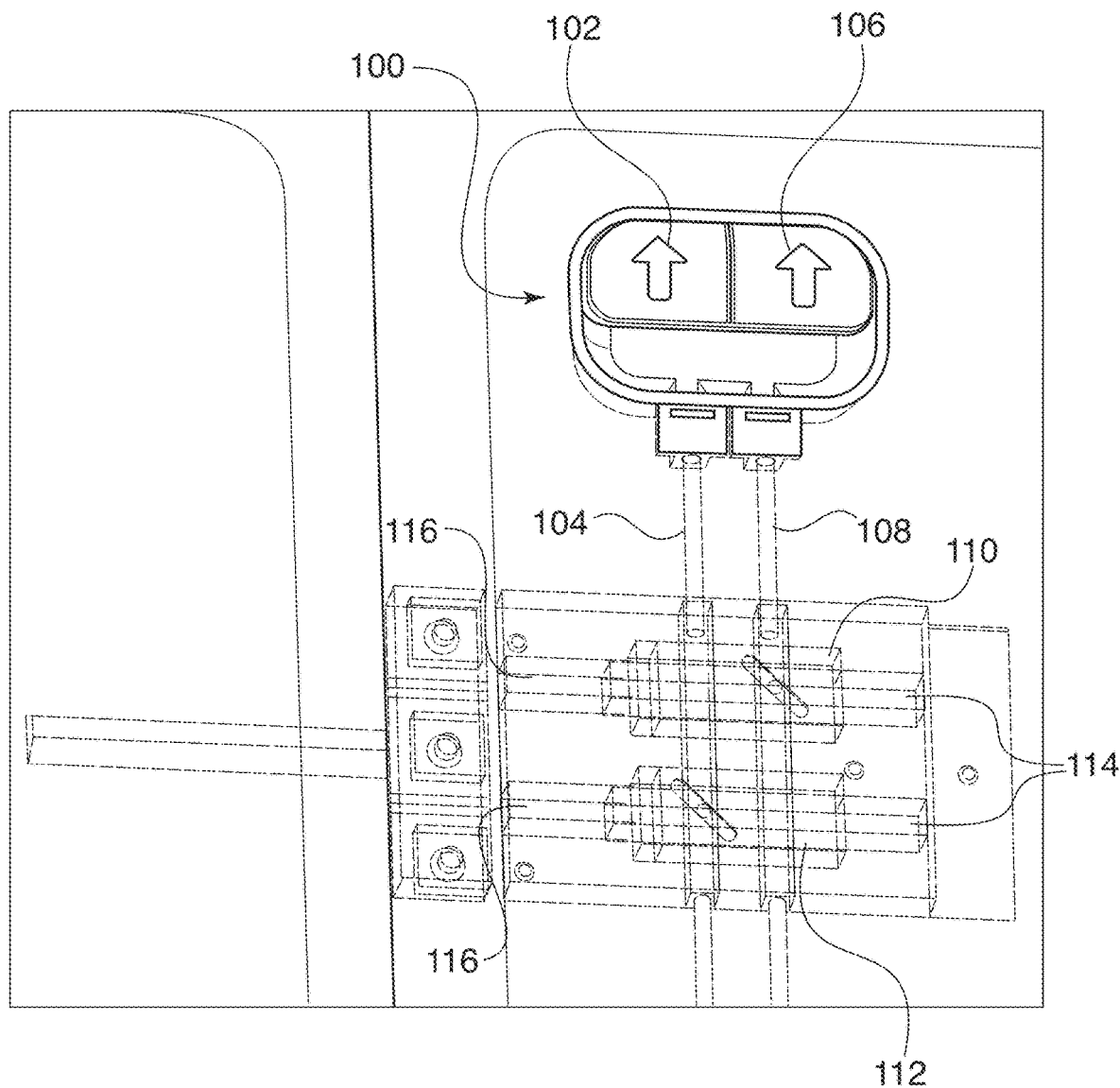
FIG. 11 shows a close up view of cooperation between the latches, elongated lock bars, and locking modules.
Figure 11A:
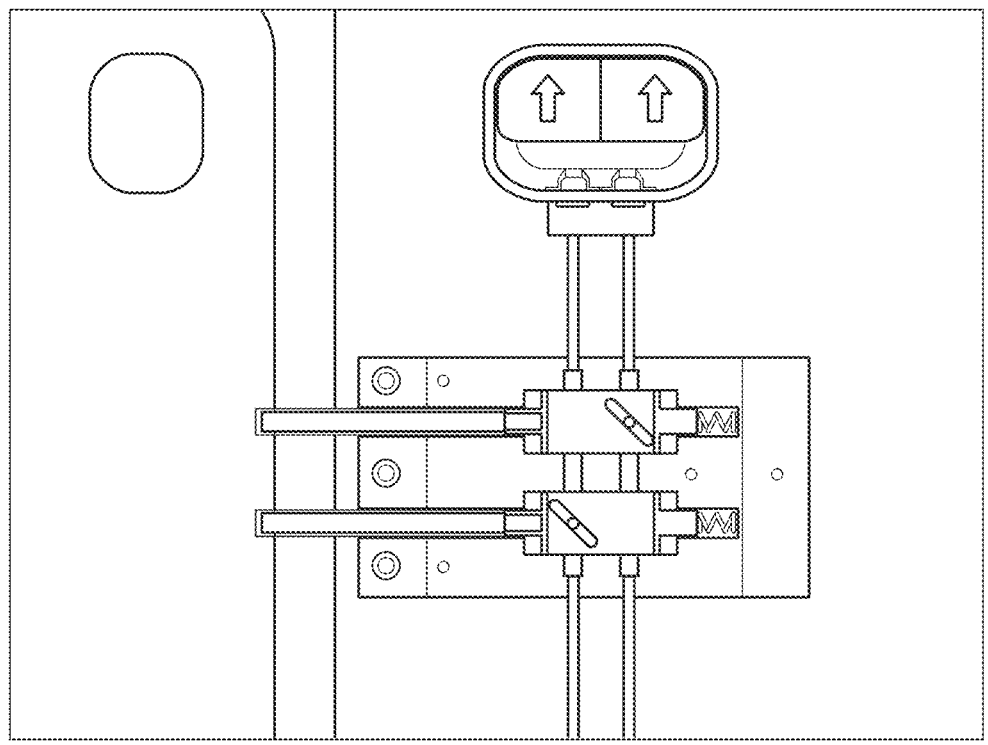
FIG. 11A shows an additional view of latches with bolts in a locked configuration.
Figure 11B:
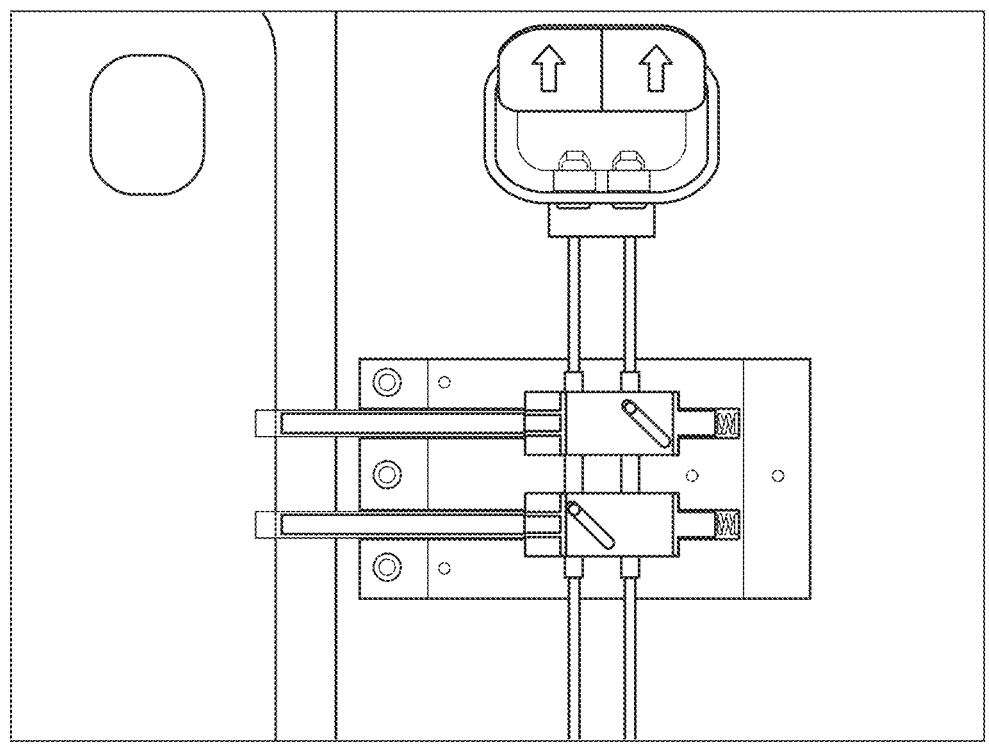
FIG. 11B shows the latches activated and the bolts in an unlocked configuration.

FIGS. 10 and 11 illustrate an alternate locking system 100. In this example, a first latch 102 activates a first elongated lock bar 104, and a second latch 106 activates a second elongated lock bar 108. Each elongated lock bar 104, 108 activates a corresponding locking module 110, 112. The locking modules are designed to translate vertical motion into horizontal motion. One or more springs 114 may be positioned in recesses of the locking modules to help encourage movement of the extending pins 116. In use, when the first elongated lock bar 104 is moved, it causes horizontal movement of the first locking module 110. When the second elongated lock bar 108 is moved, it causes horizontal movement of the second locking module 112. When both latches 102, 106 are activated, both elongated lock bars 104, 108 are raised and both locking modules 110, 112 are pulled back, retracting pins 116, and the first panel is allowed to hinge away from the second panel. When both latches 102, 106 are released, both elongated lock bars 104, 108 return to their original position and the locking modules 110, 112 cause pins 116 to extend into the opposite panel by the reactive spring 114 force, such that the door is locked closed. The locking modules are separate but operated using the latches 102, 106. FIG. 10 illustrates three separate locking systems 100, activated via one latch assembly 102, 106, and connected via extended lock bars 104, 108. It is possible, however, to provide only a single locking system, two locking systems, or more than three locking systems, depending upon door size and expected force.

By using bi-folded door designs, structural loads will be transferred via the side walls and not locally via the latches. This transfer is substantially evenly distributed. For example, the first panel is hinged to a first trolley compartment wall at a first load transferring attachment point and the second panel is removably securable to a second trolley compartment wall at a second load transferring attachment point. Additionally, the latches can be integrated in the door/workdeck and have a more elegant and smooth look because they are not functioning as high loaded parts. To keep the loads on the latches that are in the middle of the door system relatively low (so that the loads are primarily borne by the side wall retention area), the bumpers on the inside of the door can be located close to the side walls. If the trolley load or other force/load moves forward against the door bumpers, the load is introduced away from the middle latch and it will not create a large moment on it. The hinge and the retained side wall distribute all the force into the structure, via the full vertical area. This re-positioning and differentiating of the retainers for galley trolley doors prevents the load from being directed into the work-deck, but instead into the sidewalls (closer to the floor fittings).

It is also possible to provide the bi-fold doors with insulating properties, such that when the doors are closed, cooled air from the trolleys is maintained in the trolley compartment. Providing a layer of insulation on the doors and/or manufacturing the doors out of an insulating material can help minimize heat loss through the doors. Various materials have been explored for this purposes. Non-limiting examples include foam materials, vacuum insulated panels, honeycomb panels, or combinations thereof. The doors may be made thicker in order to improve cooling, particularly due to the space saved by being able to remove the dual retainer latches. It is also possible to manufacture the doors of a heavier material that can withstand higher stress loads. Providing the latching system directly into the side wall of the compartment frees the workdeck from having the be designed for load handling.

The disclosed galley compartment doors provide a new look and feel to crew and passengers (smooth surface/aligned latches), easily opening and closing (leak-tight) without providing excessive force by the crew, and provide the highest load/force possible on the door with minimal enhancements in surrounding structures.

Changes and modifications, additions and deletions may be made to the structures and methods recited above and shown in the drawings without departing from the scope or spirit of the disclosure or the following claims.

What is claimed is:

1. A trolley compartment door system, comprising:
   first and second panels configured to cooperate as a bi-fold door,
   the first panel comprising a first arm,
   the second panel comprising a second arm,
   wherein the first and second arms are hinged to one another and overlap when the bi-fold door is closed,
   wherein the first panel is hinged to a first trolley compartment side wall at a first load transferring attachment point; and
   wherein the second panel is removably securable to a second trolley compartment side wall at a second load transferring attachment point.

2. The system of claim 1, wherein the bi-fold door transfers structural loads substantially evenly distributed to the first and second trolley compartment side walls and not locally via latches.

3. The system of claim 1, wherein the first and second arms are provided on end caps that are secured to the first and second panels.

4. The system of claim 1, wherein the first arm has an inner face with at least one angled surface, wherein the second arm has as arm mating surface with at least one angled ledge that corresponds to the at least one angled surface.

5. The system of claim 1, wherein the first and second panels are insulated.

6. The system of claim 1, further comprising a locking feature.

7. The system of claim 6, wherein the locking feature comprises a dual locking feature with first and second latches that operate first and second lock bars.

8. The system of claim 7, wherein the first and second latches are configured for activation simultaneously via one hand.

9. A trolley compartment door system, comprising:
   first and second panels configured to cooperate as a bi-fold door,
   the first panel comprising a first arm having an inner face,
   the second panel comprising a second arm defining a corresponding arm mating surface,
   wherein the first and second arms are hinged to one another and overlap when the bi-fold door is closed, with the inner face and the corresponding arm mating surface flush against one another,
   wherein the first panel is hinged to a first trolley compartment side wall at a first load transferring attachment point; and
   wherein the second panel is removably securable to a second trolley compartment side wall at a second load transferring attachment point.

10. The system of claim 9, wherein the inner face of the first arm comprises a first angled edge, wherein the corresponding mating surface of the second arm comprises a second angled edge.

11. The system of claim 9, wherein the second arm further comprises a mating ledge that receives the angled edge of the first arm.

* * * * *